United States Patent [19]

Maxson et al.

[11] Patent Number: 5,037,932

[45] Date of Patent: Aug. 6, 1991

[54] STORAGE STABLE, ONE PART FLUOROSILICONE GEL COMPOSITIONS

[75] Inventors: Myron T. Maxson; Bernard VanWert, both of Midland, Mich.

[73] Assignee: Dow Corning Corporation, Midland, Mich.

[21] Appl. No.: 432,447

[22] Filed: Nov. 6, 1989

[51] Int. Cl.$^5$ .............................................. C08G 77/06
[52] U.S. Cl. ........................................ 528/15; 528/31; 528/32; 528/42; 525/478
[58] Field of Search ................ 528/15, 31, 32, 42; 525/478

[56] References Cited

U.S. PATENT DOCUMENTS

| | | | |
|---|---|---|---|
| 3,020,260 | 2/1962 | Nelson | 260/46.5 |
| 3,188,299 | 6/1965 | Chalk | 260/46.5 |
| 3,188,300 | 6/1965 | Chalk | 260/46.5 |
| 3,192,181 | 6/1965 | Moore | 260/46.5 |
| 3,333,356 | 5/1968 | Nielsen | 260/46.5 |
| 3,344,111 | 9/1967 | Chalk | 260/46.5 |
| 3,445,420 | 5/1969 | Kookootsedes et al. | 260/37 |
| 3,453,233 | 7/1969 | Flatt | 260/46.5 |
| 3,453,234 | 7/1969 | Kookootsedes | 260/46.5 |
| 3,532,649 | 10/1970 | Smith et al. | 260/18 |
| 3,867,343 | 2/1975 | Garden | 260/46.5 |
| 3,923,705 | 12/1975 | Smith | 260/2.5 S |
| 4,281,093 | 7/1981 | Garden | 528/15 |
| 4,584,361 | 4/1986 | Janik et al. | 525/478 |
| 4,719,275 | 1/1988 | Benditt et al. | 528/15 |
| 4,791,186 | 12/1988 | Janik et al. | 525/478 |
| 4,801,642 | 1/1989 | Janik et al. | 525/478 |

*Primary Examiner*—Melvyn I. Marquis
*Attorney, Agent, or Firm*—Robert Spector

[57] ABSTRACT

N,N,N',N'-tetraalkylalkylenediamines are unique with respect to their ability to impart long term storage stability to curable fluorosilicone gel compositions. While the present compositions cure realtively rapidly at temperature of 150° C. and above in bulk, small amounts of the compositions in the form of coatings and encapsulants cure in as little as 15 minutes at these temperatures.

7 Claims, No Drawings

STORAGE STABLE, ONE PART FLUOROSILICONE GEL COMPOSITIONS

BACKGROUND OF THE INVENTION

1. Field of the Invention

This invention relates to storage stable polyorganosiloxane compositions. More particularly, this invention relates to one part fluorosilicone compositions curable by a platinum catalyzed hydrosilation reaction. The compositions contain a catalyst inhibitor that imparts long term storage stability at 50° C., yet does not interfere with the rapid curing of coatings and other thin layers of the composition when these are heated above about 100° C.

2. Description of Relevant Art

Polyorganosiloxane compositions that cure by means of a platinum catalyzed hydrosilation reaction to form silicone gels are disclosed, for example, in U.S. Pat. No. 3,020,260, issued to Nelson on Feb. 6, 1962, and in U.S. Pat. No. 4,719,275, issued to Benditt and Maxson on Jan. 12, 1988. The gels described by Nelson are obtained by reacting an organosiloxane containing two silicon-bonded hydrogen atoms per molecule with a vinyl-containing copolymer wherein the repeating units are of the formulae $RViSiO$, $R_2SiO$, and $CH_3R_2SiO_{0.5}$, R is methyl or phenyl and Vi represents vinyl.

Benditt and Maxson teach reacting a polydiorganosiloxane containing fluorinated hydrocarbon radicals bonded to silicon and 2 vinyl or other ethylenically unsaturated radicals per molecule with an organohydrogensiloxane containing at least three silicon-bonded hydrogen atoms per molecule.

It is known that inhibitors for platinum catalyzed hydrosilation reactions can be added to compositions such as those of Benditt and Maxson to increase their working time by decreasing the rate at which these compositions cure at temperatures above about 100° C. While known inhibitors will partially suppress the reactivity of catalyzed compositions containing both vinyl radicals and silicon-bonded hydrogen atoms, these compositions cannot be stored for extended time periods under ambient conditions without either undergoing a substantial increase in viscosity or curing to form a solid gel.

A commercially useful one-part composition should not vary more than about 50% increase in viscosity during the several weeks that can elapse between the time the composition is prepared and the time at which it is desired to cure the composition. During this period the compositions are stored in locations where the ambient temperature may reach 50° C.

Until now it has not been feasible to prepare one part compositions of the type described in the aforementioned Benditt and Maxson patent that meet the foregoing stability requirements for commercially useful materials. Inhibitors that have been disclosed as useful catalyst inhibitors for the gel compositions taught in the aforementioned Nelson patent include the aromatic heterocyclic nitrogen compounds, pyridazine, pyrazine, quinoline, 2,2'-biquinoline, bipyridine naphthyridine, quinaldine, dialkyl formamides, thioamides, alkylthioureas and ethylene thiourea described in U.S. Pat. No. 3,188,299, issued June 8, 1965, the organophosphorus compounds described in U.S. Pat. No. 3,188,300, issued June 8, 1965, benzotriazole as described in U.S. Pat. No. 3,192,181, issued June 29. 1965. the nitrile compounds as described in U.S. Pat. No. 3,344,111, issued Sept. 26, 1967, the halocarbons described in U.S. Pat. No. 3.383.356. issued May 14, 1968, the acetylenic compounds described in U.S. Pat. No. 3,445,420, issued May 20, 1969, the vinyl silazanes described in U.S. Pat. No. 3,453,233, issued July 1, 1969, the sulfoxide compounds described in U.S. Pat. No. 3,453,234, issued July 1, 1969, the stannous salts, mercuric salts and other salts described in U.S. Pat. No. 3,532,649, issued Oct. 6, 1970 and the cyclic polymethylvinylsiloxanes discussed in U.S. Pat. No. 3,923,705, issued Dec. 2, 1975.

The use of ammonia, amines, and other nitrogen-containing compounds as inhibitors for the platinum catalyzed reaction of silicon-bonded hydrogen atoms with silicon bonded hydroxyl groups is taught in U.S. Pat. No. 3,867,343, issued to Garden on Feb. 18, 1975. U.S. Pat. No. 4,281,093, issued to Garden on July 28, 1981, discloses using these inhibitors for the reaction of SiH-containing polyorganosiloxanes with polyorganosiloxanes containing silicon-bonded hydroxyl vinyl or allyl groups. The catalysts for the reaction are organometallic complexes of platinum or rhodium. The longest gel time, i.e., time required for gelling of the reaction mixture at 25° C., reported in U.S. Pat. No. 3,867,343 is 2409 minutes, equivalent to 40.15 hours and is obtained using alpha-dipyridyl. This value does not take into account the increase in viscosity that typically occurs prior to complete gelation. The viscosity increase could render the composition unsuitable for commercial use as a one-part composition considerably prior to the time gelation occurred.

N,N,N',N'-tetramethylethylenediamine was considerably less effective as an inhibitor than alpha-dipyridyl, imparting a gel time of 1533 minutes (25.5 hours).

The data in U.S. Pat. No. 3,867,343 would not encourage the evaluation of amines and other nitrogen compounds disclosed therein as catalyst inhibitors for one-part platinum catalyzed polyorganosiloxane gel compositions that must remain stable for seVeral weeks at 50° C. prior to being cured, and which cure to a gel 60 minutes or less at 135° C. Preferred compositions cure in less than 30 minutes and are stable for several months at 50° C.

SUMMARY OF THE INVENTION

The present invention is based on the discovery that one of the many classes nitrogen compounds, namely N,N,N',N'-tetraalkylalkylenediamines, disclosed in the aforementioned U.S. Pat. No. 3,867,343 is unique with respect to its ability to impart long term storage stability to curable fluorosilicone compositions of the type disclosed in the aforementioned U.S. Pat. No. 4,719,275 to Benditt and Maxson. Coatings and other thin layers formed from these compositions cure in from 15 to 60 minutes at 150° C. Larger amounts, i.e. up to 50 grams or more, require up to about 4 hours to cure under these conditions.

DETAILED DESCRIPTION OF THE INVENTION

This invention provides a one-part liquid fluorosilicone composition that cures to a gel by means of a platinum-catalyzed hydrosilylation reaction when heated, is stable for prolonged periods of time at temperatures up to 50° C. and consists essentially of the product obtained by blending A. a liquid diorganovinylsiloxy terminated polydiorganosiloxane wherein at least 25 percent of the silicon atoms are bonded to a fluorine-containing hydrocarbon radical;

B. a compatible liquid organohydrogensiloxane containing fluorinated hydrocarbon radicals bonded to silicon and having an average of more than two silicon bonded hydrogen atoms per molecule in an amount sufficient to provide a molar ratio of silicon bonded hydrogen atoms to vinyl radicals in said composition of from 0.4 to about 1.0;

C. an amount sufficient to promote curing of said composition of a platinum-containing catalyst; and D. a platinum catalyst inhibitor.

The improvement comprises the presence in said composition of at least one N,N,N',N'-tetraalkylalkylenediamine as the platinum catalyst inhibitor. The alkyl portion of the diamine contains from 1 to 4 carbon atoms, the alkylene portion contains from 2 to 4 carbon atoms, and the amount of inhibitor is sufficient to inhibit curing of said composition in bulk form at temperatures up to 50° C. without impairing the ability of said composition to cure at temperatures above 100° C.

The Platinum Catalyst Inhibitor

The feature that distinguishes the present compositions from fluorosilicone gel compositions of the prior art, is a unique group of alkyl-substituted alkylene diamines that suppresses the activity of the catalyst under typical storage conditions sufficiently to impart long term stability to the composition without inhibiting curing of coatings and encapsulants formed from these compositions at temperatures of 150° C. and above.

The inhibitors of this invention are N,N,N',N'-tetraalkylalkylenediamines corresponding to the general formula $R^1_2NR^2NR^1_2$ where $R^1$ represents an alkyl radical containing from 1 to 4 carbon atoms and $R^2$ represents an alkylene radical containing from 2 to 4 carbon atoms. Preferably all of the $R^1$ radicals are methyl, $R^2$ is ethylene and the inhibitor is N,N,N',N'-tetramethylethylenediamine.

Using this preferred inhibitor, thin layers containing about one gram or less per square centimeter of coated surface cure in 60 minutes or less at 150° C. Larger amounts of the compositions, i.e. about 50 gram portions, are stable for at least three months at 50° C. and cure in about 4 hours at 150° C.

The concentration of inhibitor will affect the long-term storage stability of the composition and the time required to cure coatings and other thin layers formed from the composition when the layers are exposed to temperatures of at least 100° C. Concentrations as low as 5 parts by weight per one million parts by weight of total composition are useful when the storage period is relatively short, typically in the order of several hours, and a rapid cure is desired.

As the inhibitor concentration is increased to an upper limit of about 150 parts per one million parts of composition, storage stability under ambient conditions improves with a corresponding increase in the cure time of thin layers formed from these compositions. The concentration of a specific inhibitor that will satisfy the requirements for a particular end use application can readily be determined with a minimum of experimentation. The concentration range for the present inhibitors is preferably from 20 up to about 40 parts by weight per one million parts by weight of total composition.

The inhibitor concentration is relatively low and has been found critical to achieving the desired storage stability and cure rate. To ensure accuracy and reproducibility in the addition of inhibitor, it may be desirable to dilute the inhibitor in an inert liquid that is miscible with the other ingredients of the curable compositions. Liquid cyclic- and trimethylsiloxy terminated polymethyl-3,3,3-trifluoropropylsiloxanes are preferred diluents.

Applicants have discovered that the amine inhibitors described hereinbefore are quite selective and are effective only in combination with a relatively small class of fluorosilicone compositions when these compositions are applied as thin layers such as coatings and encapsulants.

The present class of catalyst inhibitors is particularly suitable for use with the curable fluorosilicone gel compositions described in the aforementioned U.S. Pat. No. 4,719,275 to Benditt and Maxson.

The amine inhibitors of this invention can be used alone to control the activity of platinum-containing hydrosilylation catalysts. The present inventor discovered that additional beneficial results are achieved when these inhibitors are combined with the acetylenic alcohols used as inhibitors in prior art organosiloxane compositions. The concentration of these alcohols in the present compositions can be from 10 to about 1000 or more parts by weight per one million parts of curable organosiloxane composition. A concentrations of from 100 to about 500 parts per million is particularly preferred.

Acetylenic alcohols that can be advantageously combined with the present amine inhibitors include but are not limited to methylbutynol and ethynylcyclohexanol.

The acetylenic alcohol increases the storage stability of the present compositions and reduces the hardness of the cured gel relative to the values obtained using the same concentration of amine in the absence of the acetylenic alcohol. While not wishing to be bound by any theory, this effect is believed due to a reaction between the acetylenic alcohol and a small fraction of the organohydrogensiloxane present in the curable organosiloxane composition.

The Vinyl-Terminated Polydiorganosiloxane
(Ingredient A)

Ingredient A can be either a homopolymer or a copolymer and is represented by the general formula

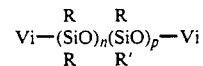

where R represents a monovalent hydrocarbon radical, R' represents the radical RfCH$_2$CH$_2$— where Rf represents a monovalent perfluorinated hydrocarbon radical containing from 1 to about 5 carbon atoms, Vi represents a vinyl radical, the sum of n and p typically represents a molecular weight equivalent to a viscosity of from 0.2 to 100 Pa.s at 25° C. and the value of n can be from 0 to 3p.

The radical represented by R can contain from 1 to about 20 carbon atoms. A range of from 1 to 10 carbon atoms is preferred based on the availability of the corresponding cyclic diorganosiloxanes used to prepare ingredient A. Preferably R is methyl, phenyl or a combination of methyl and phenyl and R' is 3,3,3-trifluoropropyl. Most preferably all of the radicals represented by R are methyl and the value of n is 0.

Ingredient A is represented in the foregoing formula as a linear molecule. It will be understood, however that in reality some of the molecules may contain branched units resulting from small amounts of trifunctional reactants present as impurities in the cyclic diorganosiloxanes used to prepare the polydiorganosiloxane (ingredient A).

Ingredient A can be a single polydiorganosiloxane species or a mixture containing two or more polydiorganosiloxanes of different molecular weights, so long as the viscosity of the mixture is within the aforementioned limits.

Ingredient A can be prepared using any of the known methods for preparing vinyl-terminated polydiorganosiloxanes. A preferred method is by the ammonia-catalyzed polymerization of the corresponding cyclic diorganosiloxane(s) to form a silanolterminated polydiorganosiloxane. This method is described in U.S. Pat. No. 4,683,277, which issued to M. T. Maxson on July 28, 1987.

The reactant used to convert the silanol terminated polydiorganosiloxane to a vinyl terminated polymer should be capable of reacting in the presence of relatively weak catalysts such as ammonia. Hexaoganodisilazanes wherein each of the two silicon atoms is bonded to a vinyl radical will react under these conditions and are therefore the reactants of choice for preparing the fluorinated polydiorganosiloxanes referred to hereinafter as ingredient A.

Methods for polymerizing cyclic diorganosiloxanes to liquid silanol terminated polydiorganosiloxanes using a variety of catalysts are sufficiently well described in the literature that a detailed description in this specification is not necessary. When ammonia is used as the catalyst, the polymerization reaction of the cyclic diorganosiloxane is typically conducted at temperatures of from 25° to about 100° C. until the desired molecular weight is achieved.

The Curing Agent (Ingredient B)

The polydiorganosiloxane (ingredient A) is cured by a hydrosilation reaction between the vinyl radicals of this ingredient and the silicon-bonded hydrogen atoms of the organohydrogensiloxane, referred to hereinafter as ingredient B. Ingredient B contains an average of more than two silicon bonded hydrogen atoms per molecule. It can contain an average of from 3 up to 20 or more silicon atoms per molecule and exhibits a viscosity of up to 10 Pa.s or higher at 25° C. Ingredient B contains repeating units of the formulae $HSiO_{1.5}$, $R''HSiO$ and/or $R''_2HSiO_{0.5}$. The molecules of ingredient B can also include one or more monoorganosiloxane, diorganosiloxane, triorganosiloxy and $SiO_2$ units that do not contain silicon bonded hydrogen atoms. In these formulae R" is a monovalent hydrocarbon radical containing from 1 to about 20 carbon atoms or a fluorinated hydrocarbon radical selected from the same group as the R radical of ingredient A. Alternatively, ingredient B can be a cyclic compound containing diorganosiloxane and organohydrogensiloxane units or a compound of the formula $Si(OSiR''_2H)_4$.

To ensure compatibility between ingredients A and B, at least a portion of the radicals represented by R" should be identical to the majority of the hydrocarbon radicals present in ingredient A. When ingredient A is the preferred polydiorganosiloxane containing methyl-3,3,3-trifluoropropylsiloxane units, at least a portion of the R" radicals should represent 3,3,3-trifluoropropyl radicals. Most preferably ingredient B is a linear dimethylhydrogensiloxy terminated polyorganosiloxane containing from one to about three repeating units per molecule, all of which correspond to the general formula

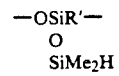

where R' represents 3,3,3-trifluoropropyl and Me represents methyl.

The molecular weights of ingredients A and B together with the number and distribution of the silicon-bonded hydrogen atoms in ingredient B will determine the location of crosslinks in the cured gel. The concentration of crosslinks per unit area is often referred to as the "crosslink density" and determines certain physical properties of the cured gel, particularly hardness and resiliency. The particular types and amounts of ingredients A and B yielding a desired combination of physical properties can readily be determined by routine experimentation with a knowledge of this invention.

The molar ratio of silicon bonded hydrogen atoms to vinyl or other ethylenically unsaturated hydrocarbon radicals present in the curable compositions of this invention is a major factor in determining the properties of the cured gel. As disclosed hereinbefore, a preferred type of organosiloxane gels is prepared from curable compositions containing a stoichiometric excess of vinyl radicals relative to silicon bonded hydrogen atoms. In the present compositions this ratio is typically from 0.4 to 0.8 silicon bonded hydrogen atoms per vinyl radical. The preferred ratio for a given composition will be determined at least in part by the average molecular weight of ingredient A and the type of organohydrogensiloxane curing agent.

The Platinum-Containing Catalyst

Hydrosilylation reactions are typically conducted in the presence of a catalyst that is a platinum group metal or a compound of one of these metals. Platinum compounds such as hexachloroplatinic acid, and particularly complexes of these compounds with relatively low molecular weight, liquid vinyl-containing organosiloxane compounds, are preferred catalysts because of their high activity and compatibility with the organosiloxane reactants. These complexes are described in U.S. Pat. No. 3,419,593 that issued to David N. Willing on Dec. 31, 1968. Complexes wherein the silicon bonded hydrocarbon radicals are vinyl and either methyl or 3,3,3-trifluoropropyl are particularly preferred because of their ability to catalyze a rapid curing of the elastomer at temperatures of at least about 70° C. A particularly preferred catalyst of this type is the complex formed by reacting hexachloroplatinic acid with a liquid dimethylvinylsiloxy terminated poly(methyl-3,3,3-trifluoropropyl)siloxane.

The platinum-containing catalyst can be present in an amount equivalent to as little as one part by weight of platinum per one million parts of curable composition. Catalyst concentrations equivalent to from 3 to 10 parts of platinum per million of curable composition are preferred to achieve a practical curing rate. Higher concentrations of platinum provide only marginal improvements in curing rate and are therefore economically unattractive, particularly when the preferred catalysts are used.

Preparation of Curable Compositions

The one-part compositions of this invention are typically prepared by blending the foregoing ingredients A. B and C together with at least one of the present catalyst inhibitors to form a homogeneous composition. The inhibitor allows the composition to be stored under ambient conditions for a period of several days up to several months, depending upon the type and concentration of inhibitor. When it is desired to cure a composition, it is heated at a temperature of about 100° C. or above until the desired degree of curing has been achieved. Temperatures of about 150° C. are preferred.

To ensure against formation of small gel particles in the curable composition it is preferred to prepare the present compositions by blending the present catalyst inhibitor with the platinum-containing catalyst, optionally in the presence of at least a portion of the liquid diorganosiloxy-terminated polydiorganosiloxane to facilitate blending. The resultant mixture is then blended with the organohydrogensiloxane together with any remaining liquid polydiorganosiloxane to form a curable composition of this invention.

The degree of curing of the gels formed from the present compositions can be conveniently determined by measuring the distance to which a penetrometer probe of known weight penetrates into the cured gel during a specified period of time. For preferred gels this value is from 3 to 8 mm. using a combined probe and plunger weight of 19.5 g. applied for five seconds.

When applied as a thin layer the present fluorosilicone compositions containing N,N,N',N'-tetramethylethylenediamine, cure in as little as 15 minutes at 150° C. It will be understood that the cure time is inversely proportional to curing temperature.

A characteristic feature of at least some of the present compositions is the occurrence of a relatively small increase in viscosity during the first seven days of storage. The total increase amounts to about 10 percent of the initial viscosity. Following this initial increase the viscosity of the composition remains substantially constant throughout the remainder of the storage period, which can be up to ten months or longer depending upon the temperature in the storage area.

The gels obtained by curing the polyorganosiloxane compositions of this invention are useful as potting compounds and conformal coatings, and are particularly useful for coating and encapsulating semiconductor devices and electronic circuits containing these devices. These devices and circuits are susceptible to damage by moisture or other contaminants present at locations where they are installed. The structural integrity of fluorosilicone gels is not adversely affected by temperatures as low as −70° C., and the gels are resistant to liquid hydrocarbons and other types of organic solvents.

The following examples demonstrate the uniqueness of representative catalyst inhibitors with respect to their chemical composition and the polyorganosiloxane compositions that can be a) stabilized and b) cured in small amounts using these inhibitors. All parts and percentages are by weight unless otherwise specified, and viscosities were measured at 25° C.

EXAMPLE 1

N,N,N',N'-tetramethylethylenediamine was evaluated as a platinum catalyst inhibitor by blending it together with a polyorganosiloxane composition consisting essentially of:

as ingredient A, 100 parts of a dimethylvinylsiloxy terminated poly(methyl-3,3,3-propyl)siloxane containing 1.05% of vinyl radicals and exhibiting a viscosity of $1.4 \times 10.3^{-3}$ m$^2$/sec. Ingredient A had been prepared by the ammonia catalyzed polymerization of 2,4,6-trimethyl-2,4,6-tris(3,3,3-trifluoropropyl)cyclotrisiloxane followed by reaction of the resultant silanol terminated polydiorganosiloxane with sym-tetramethyldivinyldisilazane;

as ingredient B, 3.7 parts of an organohydrogensiloxane curing agent represented by the average formula

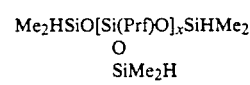

where Me represents a methyl radical, Prf represents a 3,3,3-trifluoropropyl radical, the average value of x is between 1 and 3, inclusive, and the silicon bonded hydrogen content is 0.67%;

as ingredient C, 0.07 part of a complex prepared by the reaction of hexachloroplatinic acid with a liquid dimethylvinylsiloxy terminated poly(methyl-3,3,3-trifluoropropyl)siloxane. Ingredient C contained 0.67% platinum; and as the catalyst inhibitor (ingredient D) the amounts specified in the following tables of a mixture consisting essentially of 99 weight percent of a silanol-terminated poly(methyl-3,3,3-trifluoropropyl)siloxane exhibiting a viscosity of $3 \times 10^{-3}$ m$^2$/sec and 1 weight percent of N,N,N',N'-tetramethylethylenediamine (TMEDA).

The storage stability of the compositions was evaluated by storing 50 gram samples of the compositions at 25° and 50° C. for 3 months as indicated in Table 1. Viscosity measurements were performed on the initial composition and following 1 and 3 months of storage and are recorded in Pascal seconds (Pa.s).

The ability of small portions of these one part compositions to cure in one hour at 150° C. is demonstrated in the following Table 1. One drop (equivalent to about 0.12 g.) of each composition was placed in an indentation formed in an aluminum panel. The panels were then placed for one hour in an oven maintained at a temperature of 150° C. to cure the composition.

TABLE 1

| Sample No. | 1 | 2 | 3 |
|---|---|---|---|
| Ingredient D (parts) | 0.10 | 0.16 | 0.21 |
| TMEDA (ppm) | 10 | 15 | 20 |
| Viscosity (Pa.s) | | | |
| initial | 1.125 | 1.197 | 1.106 |
| T = 25° C. 1 month | 1.246 | 1.104 | 1.160 |
| 3 months | 1.176 | 0.985 | 1.000 |
| T = 50° C. 1 month | 1.125 | 1.197 | 1.106 |
| 3 months | 1.405 | 1.417 | 1.087 |
| 0.12 g. sample @ 150° C./60 minutes | gelled | gelled | gelled |

To further demonstrate the effect of the inhibitor concentration on storage stability, curable compositions were prepared contained the same concentrations of ingredients A, B and C specified in the preceding table. The concentration of ingredient D was 0.247, 0.124 and 0.025 part, which is equivalent to 4.9, 2.48 and 0.5 ppm of TMEDA, respectively. All of these compositions gelled within 72 hours at a temperature of 25° C.

EXAMPLE 2

The thermal stability of gels prepared from the present one-part compositions was demonstrated by heating a 50 sample of the curable composition of this invention at 150° C. for four hours curable composition of this invention at 150° C. for four hours to form a 20 mm-thick sample of cured gel. The curable composition contained the following amounts of ingredients identified in Example 1

Ingredient A—100 parts; ingredient B—3.75 parts; ingredient C —0.08 parts and ingredient D—0.1 part (equivalent to 10 ppm of TMEDA).

The cured gel was heated at 150° C. and penetration values were determined at the elapsed time values indicated in the following table. The penetration value of the gel was measured using a penetrometer manufactured by Precision Scientific Company (Catalog Number 73.510). The standard cones supplied with the instrument were replaced with a brass head measuring 3.2 mm. in diameter. 4.672 mm. in height and having a flat bottom and rounded edges. The total weight of the shaft and head was 19.5 grams and the penetration reading was taken five seconds after placement of the head on the surface of the cured gel.

| ELAPSED TIME (Hours) | PENETRATION READING (mm) |
| --- | --- |
| 18 | 7.5 |
| 24 | 7.1 |
| 215 | 6.5 |
| 315 | 2.0 |

These data demonstrate no appreciable hardening of the gel occurred over a 215 hour period at a temperature of 150° C.

EXAMPLE 3

This example demonstrates the concentration range over which the present inhibitors can be used in combination with methylbutynol, a known platinum catalyst inhibitor, to impart storage stability to fluorosilicone gel compositions without impairing the ability of coatings formed from these compositions to cure at 150° C.

The curable compositions contained 100 parts of ingredient A identified in Example 1. 3.1 parts of ingredient B. 0.078 part of ingredient C and 0.02 part of methylbutynol. The amine inhibitor was added as a solution consisting essentially of 99.9 parts of the polysiloxane present in ingredient D of Example 1 and 0.1 part of TMEDA. The concentrations of TMEDA present in the six compositions evaluated are recorded in the following table together with the cure characteristics and storage stability of the compositions.

The curability of the compositions was determined by placing one drop of the composition in an indentation formed on an aluminum panel and placing the panel for 30 minutes in an oven maintained at a temperature of 150° C. All of the compositions cured under these conditions. In addition, a 50 gram sample of each compositions was stored at room temperature. The viscosity of each sample was measured after 12 or 13 days and after the sample had been stored at room temperature for 90 days. Sample 4 cured in less than ten days under these conditions and sample 5 cured in ten days. The remaining samples were still fluid 90 days after being prepared.

| Sample No. | TMEDA (ppm) | Interim Viscosity (Pa.s) | Final Viscosity (Pa.s) (after 90 days) |
| --- | --- | --- | --- |
| 4 | 10 | Cured in <10 days | |
| 5 | 20 | Cured in 10 days | |
| 6 | 40 | 1.15 (12 days) | 1.57 |
| 7 | 60 | 0.93 (13 days) | 1.31 |
| 8 | 80 | 0.79 (13 days) | 0.60 |
| 9 | 120 | 0.69 (13 days) | 1.07 |

EXAMPLE 4

This example demonstrates the inability of a preferred inhibitor of this invention to stabilize a one-part silica-reinforced polyorganosiloxane elastomer composition containing a vinyl terminated polydimethylsiloxane, an organohydrogensiloxane containing an average of five silicon-bonded hydrogen atoms per molecule and a platinum catalyst in addition to a fume silica filler. The composition was prepared by combining the following ingredients to form a homogeneous mixture:

188 parts of a dimethylvinylsiloxy terminated polydimethylsiloxane viscosity=2 Pa.s at 25° C., 8.9 parts of hexamethyldisilazane, 2.8 parts of distilled water, 0.13 part of the platinum catalyst described in example 1, 35.8 parts of fume silica, 12 parts of a trimethylsiloxy terminated dimethylsiloxane/methylhydrogensiloxane copolymer containing an average of five methylhydrogensiloxane units and three dimethylsiloxane units per molecule, 0.4 part of a cyclic polymethylvinylsiloxane and 50 parts per million, based on the total composition of TMEDA The resultant composition was allowed to stand at room temperature for eighteen hours, during which it cured to a solid elastomer.

EXAMPLE 5

This example demonstrates the inability of acetylenic type platinum catalyst inhibitors to impart the degree of storage stability characteristic of the present compositions. The ingredients of the compositions are described in the preceding Example 1. The compositions contained 100 parts of polyorganosiloxane identified as ingredient A, 3.1 parts of ingredient B and 0.078 part of ingredient C in addition to the inhibitor. The inhibitors evaluated were 3,5-dimethylhexyn-3-ol (DMH), methylbutynol (MB) and ethynylcyclohexanol (ETCH) at the concentrations indicated in the following table. All of the compositions also contained 0.02 weight percent of methylbutynol One drop of each material was placed an indentation formed on an aluminum panel, which was then heated at a temperature of 165° C. for 30 minutes to determined the characteristics of the cured material. Bulk samples were also stored for 14 days at room temperature (RT) and then evaluated. The results are recorded in the following table.

| Sample No. | Inhibitor Type | Wt. % | 30 minutes @ 165° C. | 14 days @ RT |
| --- | --- | --- | --- | --- |
| 10 | DMH | 0.04 | Cured | Cured |
| 11 | DMH | 0.08 | I.C.* | Cured |
| 12 | DMH | 0.16 | Thick Fluid | Thick Fluid |
| 13 | MB | 0.04 | I.C. | Cured |
| 14 | MB | 0.08 | I.C. | Cured |

-continued

| Sample No. | Inhibitor Type | Wt. % | 30 minutes @ 165° C. | 14 days @ RT |
|---|---|---|---|---|
| 15 | MB | 0.16 | Thick Fluid | Thick Fluid |
| 16 | ETCH | 0.04 | Cured | Cured |
| 17 | ETCH | 0.08 | Cured | Cured |
| 18 | ETCH | 0.16 | Thick Fluid | Thick Fluid |

*I.C. = Incomplete Cure

Note
All of the compositions contained 0.02 weight percent of methylbutynol in addition to the inhibitors listed.

That which is claimed is:

1. In a one-part liquid fluorosilicone composition that cures to a gel by means of a platinum-catalyzed hydrosilylation reaction when heated, is stable for prolonged periods of time under ambient conditions and consists essentially of the product obtained by blending
   A. a liquid diorganovinylsiloxy terminated polydiorganosiloxane wherein at least 25 percent of the silicon atoms are bonded to a fluorine-containing hydrocarbon radical;
   B. a compatible liquid organohydrogensiloxane containing fluorinated hydrocarbon radicals bonded to silicon and having an average of more than two silicon bonded hydrogen atoms per molecule in an amount sufficient to provide a molar ratio of silicon bonded hydrogen atoms to vinyl radicals in said composition of from 0.5 to about 1.0;
   C. an amount sufficient to promote curing of said composition of a platinum-containing catalyst; and
   D. a platinum catalyst inhibitor, the improvement comprising the presence in said composition of at least one N,N,N'N'-tetraalkylalkylenediamine as the platinum catalyst inhibitor, where the alkyl portion of the diamine contains from 1 to 4 carbon atoms, the alkylene portion contains from 2 to 4 carbon atoms, and the amount of inhibitor is sufficient to inhibit curing of said composition in bulk form at 25° C. without impairing the ability of said composition to cure at temperatures above 100° C.

2. A composition according to claim 1 where said platinum catalyst inhibitor is N,N,N',N'-tetramethylethylenediamine and the concentration of said platinum catalyst inhibitor is from 5 to 150 parts by weight per million parts by weight of said composition.

3. A composition according to claim 2 where the concentration of said platinum catalyst inhibitor is from 5 to 20 parts by weight per million parts by weight of said composition.

4. A composition according to claim 1 where said platinum catalyst inhibitor is used in combination with an amount of an acetylenic alcohol sufficient to further increase the storage stability of said composition and reduce the hardness of said gel.

5. A composition according to claim 4 where said alcohol is methylbutynol or ethynylcyclohexanol and is present at a concentration of from 10 to 1000 parts by weight per million parts of said composition.

6. A composition according to claim 5 where the concentration of said alcohol is from 100 to 500 parts by weight per million parts of said composition.

7. A composition according to claim 1 where said polydiorganosiloxane is prepared by the ammonia-catalyzed polymerization of at least one cyclic diorganosiloxane followed by reaction of the resultant liquid silanol terminated polydiorganosiloxane with at least a stoichiometric amount of a hexaorganodisilazane wherein a vinyl radical is bonded to each of the two silicon atoms.

* * * * *